United States Patent [19]
Voss et al.

[11] Patent Number: 4,772,441
[45] Date of Patent: Sep. 20, 1988

[54] STYRENE POLYMERS CONTAINING BLOWING AGENTS

[75] Inventors: Harro Voss, Ludwigshafen; Klaus Hahn, Kirchheim; Walter Manfred, Speyer; Isidoor DeGrave, Wachenheim, all of Fed. Rep. of Germany

[73] Assignee: BASF Aktiengesellschaft, Ludwigshafen, Fed. Rep. of Germany

[21] Appl. No.: 63,823

[22] Filed: Jun. 19, 1987

[51] Int. Cl.$^4$ .............................. C08J 9/22; C08J 9/24
[52] U.S. Cl. ...................................... 264/53; 264/126; 264/DIG. 5; 264/DIG. 7; 264/DIG. 9; 521/58; 521/60; 521/910
[58] Field of Search ................... 264/53, 126, DIG. 5, 264/DIG. 7, DIG. 9; 521/58, 60, 910

[56] References Cited

U.S. PATENT DOCUMENTS 3,342,760  9/1967  Rode et al. ..................... 260/2.5

FOREIGN PATENT DOCUMENTS 2133531  1/1973  Fed. Rep. of Germany .
1155904  6/1969  United Kingdom .

Primary Examiner—Morton Foelak
Attorney, Agent, or Firm—Keil & Weinkauf

[57] ABSTRACT

Particulate styrene polymers containing blowing agents are prepared by a process in which an aliphatic hydrocarbon of 7 to 9 carbon atoms is added in an amount of from 0.01 to 0.5% by weight, based on the styrene polymer, before, during or after the polymerization. The particulate styrene polymers can be processed to foam blocks and moldings having a satisfactory smooth surface.

2 Claims, No Drawings

STYRENE POLYMERS CONTAINING BLOWING AGENTS

The present invention relates to particulate styrene polymers (EPS) which contain blowing agents and which give moldings having an improved surface. The production of moldings from styrene polymer foams is known. The procedure which has proven useful in industry is one in which the expandable polymer particles containing a blowing agent are heated above their softening point until they have expanded to form a loose heterogeneous mixture having the desired bulk density. This process is known as pre-expanding. The expanded particles are then welded to foam blocks or foam moldings in closed molds.

It has now been found that in some cases, particularly where an EPS of greater expandability is produced by reducing the viscosity number according to DIN 53,726, the surface quality of the foam blocks and moldings is unsatisfactory. In these cases, the surfaces are not level and smooth; instead, the individual beads are clearly raised above the surface. The surfaces are therefore very irregular, and an orange peel effect is obtained. In the case of complicated moldings, for example those having thin webs, this results in defective and useless parts.

It is an object of the present invention to improve the products in such a way that smooth, satisfactory surfaces are formed.

We have found that this object is achieved by particulate expandable styrene polymers containing, as blowing agents, (a) from 3 to 10% by weight, based on the styrene polymer, of a hydrocarbon of 4 to 6 carbon atoms or a halohydrocarbon, and (b) from 0.01 to 0.5% by weight, based on the styrene polymer, of an aliphatic hydrocarbon of 7 to 9 carbon atoms.

British Pat. No. 1,155,904 and U.S. Pat. No. 3,342,760 disclose expandable styrene polymers and foams produced from these which contain pentane as the sole blowing agent. In comparison, foam moldings produced from expandable styrene polymers using the novel combination of blowing agents having a substantially improved surface quality.

German Laid-Open Application DOS 2,133,531 discloses that foams of expandable styrene polymers exhibit very little after-shrinkage if a blowing agent mixture consisting of from 0.05 to 3% by weight of propane and from 0.1 to 7% by weight of an aliphatic or cycloaliphatic hydrocarbon of 7 to 15 carbon atoms is used. However, because of the high volatility of the propane, which boils at −42° C., expandable styrene polymers of this type have only a short shelf life.

For the purposes of the present invention, styrene polymers are polystyrene and copolymers of styrene with other alpha,beta-olefinically unsaturated compounds which contain not less than 50 parts by weight of styrene as copolymerized units. Examples of suitable comonomers are alpha-methylstyrene, styrenes which are halogenated in the nucleus, styrenes which are alkylated in the nucleus, olefins of 2 to 4 carbon atoms, such as ethylene, propylene and butylene, acrylonitrile, esters of acrylic or methacrylic acid with alcohols of 1 to 8 carbon atoms, N-vinyl compounds, such as vinylcarbazole, maleic anhydride or small amounts of compounds which contain two polymerizable double bonds, such as butadiene, divinylbenzene or butanediol diacrylate. The styrene polymers can also be used as a mixture with up to 50% by weight, based on the mixture, of olefin (co)polymers, for example (co)polymers of ethylene or propylene.

The styrene polymers contain a plurality of blowing agents dispersed homogeneously. The main component of the blowing agent consists of hydrocarbons of 4 to 6 carbon atoms or halohydrocarbons which are gaseous or liquid under normal conditions and do not dissolve the styrene polymer, and whose boiling point is below the softening point of the polymer. Examples of suitable blowing agents of this type are butane, pentane, cylcopentane, hexane, cyclohexane, dichlorodifluoromethane and trifluorochloromethane. These blowing agents are used in amounts of from 3 to 10% by weight, based on the styrene polymer.

The other novel component b of the blowing agent consists of aliphatic hydrocarbons of 7 to 9 carbon atoms, preferably n-octane, in amounts of from 0.01 to 0.5, preferably 0.025, in particular from 0.05 to 0.2, % by weight, based on the styrene polymer.

The styrene polymers may also contain other added substances which impart certain properties to the expandable products. Examples are flameproofing agents based on organic bromine or chlorine compounds, such as trisdibromopropyl phosphate, hexabromocyclododecane or a chloroparaffin, and synergists for flameproofing agents, such as dicumyl and readily decomposable organic peroxides, as well as antistatic agents, stabilizers, colorants, lubricants, fillers and substances which prevent adhesion during expanding, such as zinc stearate, melamine/formaldehyde condensates or silica, and agents for reducing the molding time during expanding, e.g. glycerol esters or hydroxycarboxylates. The additives can be dispersed homogeneously in the particles or may be present as a surface coating, depending on the effect intended.

The present invention is of particular importance in the case of styrene polymers prepared according to DE-A-32 34 600 by polymerization of the monomers in aqueous suspension, from 0.01 to 1, preferably from 0.05 to 0.5, % by weight of a bromine-free organic compound having a chain propagation constant K of from 0.1 to 50 being added during the polymerization at a styrene conversion of 20–90%, with the result that the viscosity number according to DIN 53,726 is reduced. The reduction in the viscosity number can also be achieved by other suitable measures, for example by increasing the polymerization temperature or the initiator concentration.

The suspension polymerization of styrene is known per se. It is described in detail in the Kunststoff-Handbuch, volume V, Polystyrol, Carl Hanser-Verlag, pages 679–688. In this process, in general styrene, with or without the abovementioned comonomers, is suspended in water and the conventional organic or inorganic suspension stabilizers are added, preferably in amounts of from 0.05 to 2% by weight, based on the suspension. The polymerization is generally carried out at from 80° to 130° C., preferably from 100° to 120° C. The polymerization is initiated using organic polymerization initiators, for example peroxides or azo compounds, which decompose to give free radicals under the action of heat. They are employed in amounts of from 0.01 to 1% by weight, based on the monomers.

Styrene polymers prepared by other processes are also suitable for the process according to the invention. For example, commercial polymers produced by mass polymerization can be converted by extrusion to granules having a particle diameter of from 0.2 to 8 mm, and these granules are then impregnated with the blowing agent in suspension, or the blowing agent is mixed with the styrene polymer in the extruder itself.

According to the invention, the aliphatic hydrocarbons of 7 to 9 carbon atoms, preferably n-octane, are added before, during or after the polymerization. The aliphatic hydrocarbon can be metered in together with the blowing agent a; however, it is also possible, for example, for the aliphatic hydrocarbon to be initially taken in the polymerization mixture while the blowing agent a is added in the course of the polymerization. If the aliphatic hydrocarbon is added after polymerization is complete, it is advantageous to impregnate the polymer with the said hydrocarbon by stirring for from 2 to 6 hours at elevated temperatures in the polymer suspension. The hydrocarbon added can also advantageously be mixed, together with the blowing agent a, with the styrene polymer in the melt, for example in an extruder.

The novel styrene polymer particles containing a blowing agent generally have a diameter of from 0.2 to 8 mm, preferably from 0.2 to 4 mm. They can be pre-expanded by a conventional method, for example with steam, to give foam particles having a diameter of from 0.5 to 2 cm and a density of from 5 to 100 g.l$^{-1}$. The pre-expanded particles can then be expanded by a conventional process to give foam particles having a bulk density of from 5 to 100 g.l$^{-1}$.

In the Examples, parts and percentages are by weight.

EXAMPLES

(1) Polymerization (a) In a pressure-tight stirred kettle of corrosionresistant steel, a stirred mixture of 150 parts of water, 0.1 part of sodium pyrophosphate, 100 parts of styrene, 0.45 part of benzoyl peroxide and 0.15 part of tert-butyl perbenzoate and 0.2 part of n-octane was heated to 90° C.

After 2 hours at 90° C., 4 parts of 10% strength aqueous solution of polyvinylpyrrolidone were added. After 3 hours at 90° C., 7 parts of n-pentane were metered in, after which stirring was continued for 1 hour at 95° C., then for 2 hours at 105° C. and finally for 2 hours at 125° C. The resulting granules having a mean particle diameter of 1.3 mm were isolated and dried. The viscosity number of the polymer according to DIN 53,726 was 72.5 [ml/g].

(b) In a pressure-tight stirred kettle of corrosionresistant steel, a stirred mixture of 150 parts of water, 0.1 part of sodium pyrophosphate, 100 parts of styrene, 0.45 part of benzoyl peroxide, 0.15 part of tert-butyl perbenzoate and 0.15 part of n-octane was heated to 90° C.

After 2 hours at 90° C., 4 parts of a 10% strength aqueous solution of polyvinylpyrrolidone were added. After 3 hours at 90° C., 7 parts of n-pentane containing 0.1 part of tert-dodecylmercaptan were metered in, after which stirring was continued for a further hour at 90° C., then for 2 hours at 100° C. and thereafter for 2 hours at 120° C.

The resulting granules having a mean bead diameter of 1.4 mm were isolated and dried. The viscosity number of the polymer according to DIN 53,726 was 71.3 [ml/g].

(c) Comparative Example 1

In a pressure-tight stirred kettle of corrosionresistant steel, a mixture of 150 parts of water, 0.1 part of sodium pyrophosphate, 100 parts of styrene, 0.45 part of benzoyl peroxide and 0.15 part of tert-butyl perbenzoate was heated to 90° C.

After 2 hours at 90° C., 4 parts of a 10% strength aqueous solution of polyvinylpyrrolidone were metered in. After 3 hours at 90° C., 7 parts of n-pentane were added.

Stirring was continued for 1 hour at 90° C., then for 2 hours at 105° C. and finally for 2 hours at 125° C. The resulting granules having a mean particle diameter of 1.4 mm were isolated and dried. The viscosity number of the polymer according to DIN 53,726 was 72.1 [ml/g].

(d) Comparative Example 2

The procedure described in Example 1b) was followed, except that the addition of n-octane was dispensed with.

The resulting granules had a mean bead diameter of 1.35 mm. The viscosity number of the polymer according to DIN 53,726 was 72.1 [ml/g].

(2.) Sieve analysis and coating

The bead polymers obtained were divided into different sieve fractions. The 1.2–1.8 mm fraction, which is usually used for the production of blocks, and the 0.4–0.7 mm fraction, which is used in practice for the production of moldings, were tested. The block fraction was coated with 0.2 part of a mixture of glycerol monostearate and Zn stearate in a ratio of 6:1. The molding fraction was coated with 0.5 part of a mixture of the same substances in a ratio of 5:1.

(3.) Processing (a) Block fraction

The coated beads of the 1.2–1.8 mm sieve fraction were pre-expanded in a continuous stirred pre-expansion box of the type Rauscher C 69, by means of a stream of steam, to a bulk density of 15±0.1 g/l. The throughput achieved in kg/h was determined.

The pre-expanded material was then stored for 24 hours, after which it was welded to a block in a 500 Rauscher block mold by steam treatment under 1.7 bar for 10 seconds. After the expanded block had been stored for 24 hours, its surface was assessed on the basis of a 5-step scale. Step 5 means a very irregular surface. The outer spherical caps of the individual beads are more than 1.5 mm higher than the boundary lines along which the individual beads abut one another. Step 1 means a smooth, completely even block surface.

The test results of Examples 1a to 1d are summarized in Table 1.

TABLE 1

| Product | Throughput during pre-expansion | Surface |
|---|---|---|
| According to 1a | 190 | 1–2 |
| According to 1b | 220 | 1–2 |
| According to 1c | 170 | 4–5 |
| According to 1d | 200 | 4–5 |

(b) Molding fraction

The coated beads of the 0.4–0.7 mm sieve fraction were pre-expanded in a continuous stirred pre-expansion box of the type Rauscher C 69, by means of a stream of steam, to a bulk density of 20±0.2 g/l. The throughput achieved in kg/h was determined.

Thereafter, some of the pre-expanded material was stored for 24 hours and some for 96 hours. A relatively complicated molding was produced from the material samples stored in this manner, on a Kurtz automatic machine under reduced pressure. The molding was stored for 24 hours, after which its surface was assessed on the basis of a 5-step scale. Step 5 means a very irregular, uneven surface. The outer spherical caps of the individual beads are more than 0.3 mm above the boundary lines along which the individual beads abut one another. The test results of Examples 1a to 1d are summarized in Table 2.

TABLE 2

| Product | Throughput during pre-expansion | Molding surface after storage | |
|---|---|---|---|
| | | for 24 h | for 96 h |
| According to 1a | 340 | 1-2 | 2 |
| According to 1b | 390 | 1-2 | 2 |
| According to 1c | 260 | 2-3 | X |
| According to 1d | 355 | 3 | X |

X = Defect-free moldings could no longer be produced.

We claim:

1. A process for the production of foam moldings having a bulk density of from 5 to 100 g.l$^{-1}$ by expanding a particulate styrene polymer containing blowing agents and then welding the resulting pre-expanded particles in closed molds, wherein the particulate styrene polymer used contains, as blowing agents,
    (a) from 3 to 10% by weight, based on the styrene polymer, of a hydrocarbon of 4 to 6 carbon atoms or a halohydrocarbon, and
    (b) from 0.01 to 0.5% by weight, based on the styrene polymer, of an aliphatic hydrocarbon of 7 to 9 carbon atoms.
2. The process of claim 1, wherein blowing agent (a) is n-pentane and blowing agent (b) is n-octane.

* * * * *

UNITED STATES PATENT AND TRADEMARK OFFICE
CERTIFICATE OF CORRECTION

PATENT NO. : 4,772,441

DATED : September 20, 1988

INVENTOR(S) : Voss et al.

It is certified that error appears in the above-identified patent and that said Letters Patent is hereby corrected as shown below:

On the Title Page, add

[30] Foreign Application Priority Data

June 20, 1986 (DE) Fed. Rep of Germany ... 3620683

Signed and Sealed this

Fourth Day of April, 1989

Attest:

*Attesting Officer*

DONALD J. QUIGG

*Commissioner of Patents and Trademarks*